United States Patent [19]
Hitomi et al.

[11] Patent Number: 5,374,478
[45] Date of Patent: Dec. 20, 1994

[54] MAGNETIC RECORDING MEDIUM HAVING A MAGNETIC LAYER COMPRISING MAGNETIC POWDER, BINDER, AND A SINGLE CARBON BLACK HAVING A SPECIFIED NARROW PARTICLE SIZE DISTRIBUTION

[75] Inventors: Yousuke Hitomi; Tsunehiko Ikarashi, both of Tokyo, Japan

[73] Assignee: TDK Corporation, Tokyo, Japan

[21] Appl. No.: 899,904

[22] Filed: Jun. 17, 1992

[30] Foreign Application Priority Data

Jun. 17, 1991 [JP] Japan ................... 3-171714

[51] Int. Cl.$^5$ ............................................. G11B 5/00
[52] U.S. Cl. ................................... 428/323; 428/336; 428/408; 428/694 BN; 428/900
[58] Field of Search ............... 428/694, 694 BN, 900, 428/408, 323, 336

[56] References Cited

U.S. PATENT DOCUMENTS

4,952,458  8/1990  Niyoshi et al. .................. 428/323
5,026,598  6/1991  Koyama et al. ................. 428/323

FOREIGN PATENT DOCUMENTS

58-133626  8/1983  Japan .
63-055721  3/1988  Japan .
1-32573   7/1989  Japan .

*Primary Examiner*—Stevan A. Resan
*Attorney, Agent, or Firm*—Oblon, Spivak, McClelland, Maier, & Neustadt

[57] ABSTRACT

In order to reduce the coefficient of friction of a coated type magnetic recording medium and improve the running stability and electromagnetic conversion characteristics thereof, a carbon black having a mean primary particle diameter of 25 to 65 m$\mu$m with the standard deviation $\sigma$ of the particle size distribution lying at 12 to 24 m$\mu$m is incorporated in the magnetic layer.

2 Claims, 2 Drawing Sheets

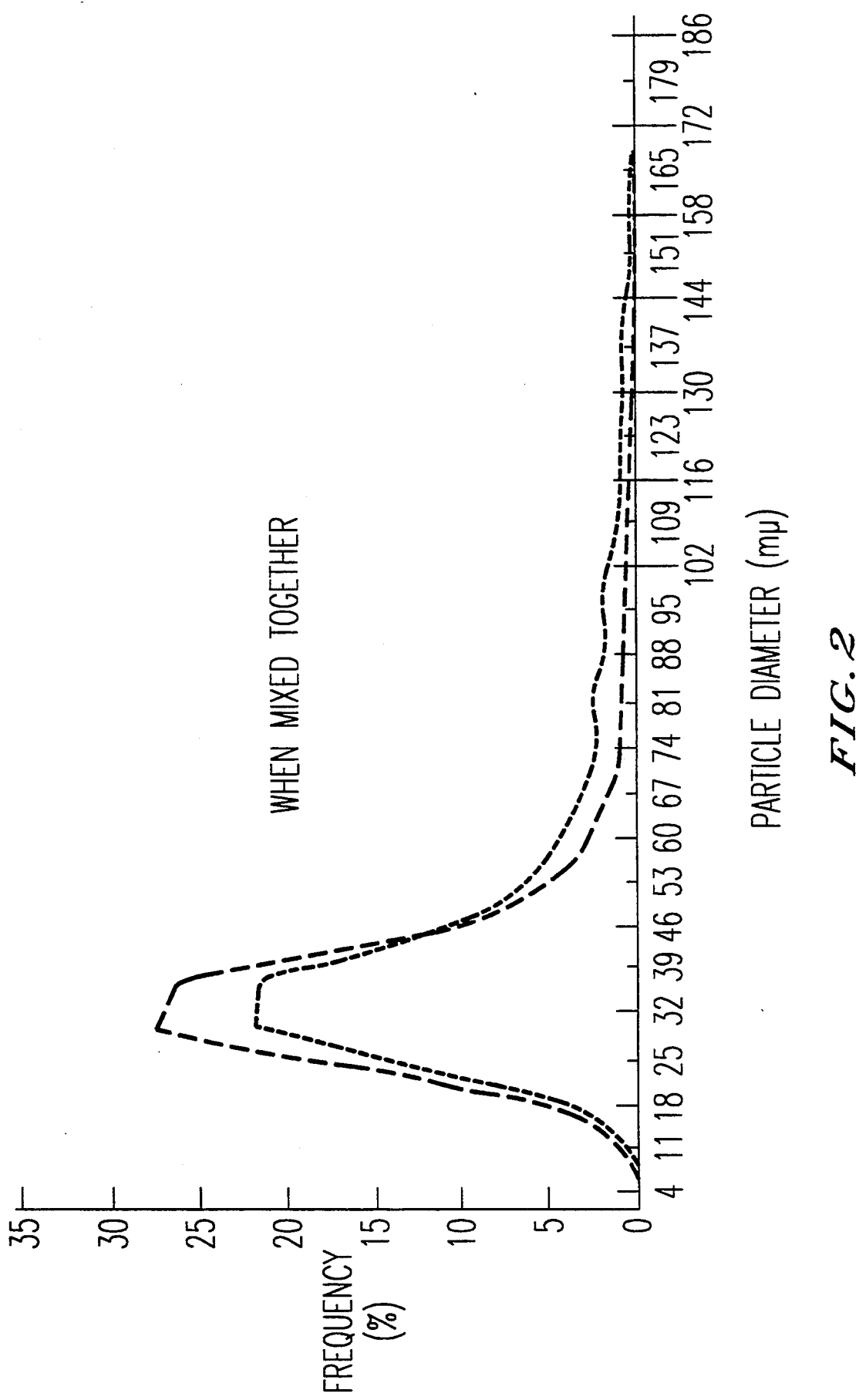

MAGNETIC RECORDING MEDIUM HAVING A MAGNETIC LAYER COMPRISING MAGNETIC POWDER, BINDER, AND A SINGLE CARBON BLACK HAVING A SPECIFIED NARROW PARTICLE SIZE DISTRIBUTION

BACKGROUND OF THE INVENTION

1. Technical Field

This invention relates to a coated type of magnetic recording media such as various magnetic tapes or various floppy disks.

2. Background Art

Various magnetic recording media including on a nonmagnetic support substrate a coated type magnetic layer obtained by dispersing ferromagnetic powders in a binder are generally used. In order to achieve an improvement in the recording density, however, it is naturally necessary to record high-frequency signals having short recording wavelengths. This, however, makes a lowering of the reproduction output unavoidable.

In order to prevent such an output drop, it is necessary to bring a medium in as microscopically close contact with the associated head as possible, thereby reading signals from the medium with a reduced spacing loss and without waste. For this purpose, the magnetic layer is required to be much more smoothed on its surface than ever before. However, smoothing the surface of the magnetic layer gives rise to an increase in the area of contact of the magnetic head with the medium, which in turn makes their coefficient of friction too large to disturb the stable running of the medium and decrease the wear resistance of the medium or head.

It has been known so far in the art that improving the running stability of a magnetic recording medium is achieved by adding various lubricants to the magnetic layer, thereby lowering the coefficient of friction. However, excessive use of the lubricants so as to improve the surface slip characteristics of the magnetic layer causes the magnetic layer to bloom out on the surface, rendering the running of the medium unstable, permits the associated magnetic head to be clogged up, dusted or otherwise have trouble, and gives rise to output and S/N ratio drops. When the amounts of the lubricants added are too small, on the other hand, their lubricating action becomes insufficient, failing to improve the running characteristics of the medium. Thus, not only is it very difficult to use the magnetic recording medium, but much difficulty is involved in designing it.

Apart from this, it has been known to use an MT class of low-structure carbon black so as to achieve a lowering of the coefficient of friction (JP-P-1-32573, JP-Kokai-58-133626, etc.).

However, such carbon black having a large particle diameter in a matter of 200 m$\mu$m have been found to be less effective, because its unfavorable dispersibility gives rise to considerable output and S/N ratio drops.

DISCLOSURE OF THE INVENTION

It is a major object of this invention to provide a magnetic recording medium which has a low coefficient of friction and a high running stability, is improved in terms of electromagnetic conversion characteristics and is capable of achieving high-density recording.

This object is attained by the following aspects (1)–(4) of this invention.

(1) A magnetic recording medium including on a nonmagnetic support substrate a magnetic layer in which ferromagnetic fine powders and carbon black are dispersed in a binder, wherein:

said carbon black has a mean primary particle diameter lying in the range of 25 to 65 m$\mu$m with the standard deviation $\sigma$ of the particle size distribution lying at 12 to 24 m$\mu$m.

(2) A magnetic recording medium recited in the above-mentioned (1), wherein said carbon black has an oil absorption in DBP of at most 100 ml/100 g and a BET specific surface area of at most 100 m²/g.

(3) A magnetic recording medium recited in the above-mentioned (1), wherein the content of said carbon black is at most 15 parts by weight per 100 parts by weight of said ferromagnetic fine powders.

(4) A magnetic recording medium recited in any one of the above-mentioned (1) to (3), in which the sliding speed relative to a magnetic head is at least 0.5 m/sec.

BRIEF DESCRIPTION OF THE DRAWINGS

FIG. 2 is a graphical representation showing the particle size distribution of two carbon blacks when mixed together for use.

ILLUSTRATIVE STRUCTURE

Figure 1:
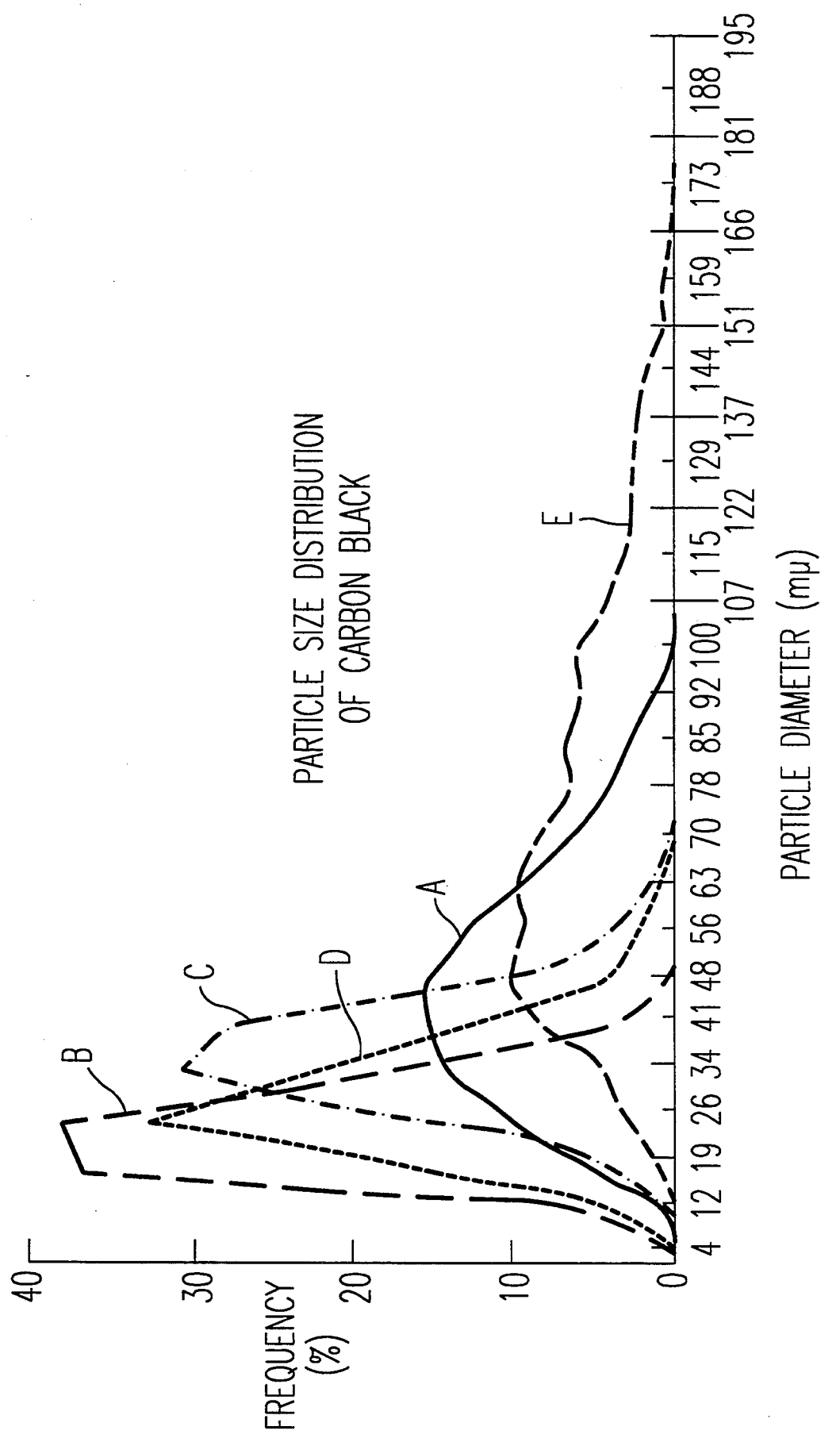
FIG. 1 is a graphical representation showing the particle size distribution of carbon black added to the magnetic layer of the magnetic recording medium according to this invention.

In the ensuing description, the illustrative construction of this invention will be explained at great length.

For a coated type magnetic recording medium, it has been known that in order to prevent the medium from being injured or otherwise damaged by head clogging-up or dusting and reduce the coefficient of friction, relatively large, hard particles such as those of low-structure carbon black or graphite are provided in the vicinity of the surface of the magnetic layer.

In this case, graphite is of large size and so is less effective than carbon black, if they are used at the same amount. As mentioned above, however, the low-structure carbon black used so far to reduce the coefficient of friction is too large in diameter to stand up to practical use in view of electromagnetic conversion characteristics.

For this reason, the present invention makes use of a carbon black having a mean primary particle diameter, d, lying in the range of 25 to 65 m$\mu$m, more preferably 30 to 60 m$\mu$m, with the standard deviation $\sigma$ of the particle size distribution lying at 12 to 24 m$\mu$m, more preferably 14 to 20 m$\mu$m.

A large particle diameter type of carbon blacks represented by conventionally used MT and FT classes of low-structure carbon blacks possibly contain particles larger than expected, because they have too large a mean particle diameter with the $\sigma$ of the particle size distribution being relatively large; that is, considerable deterioration of electromagnetic conversion characteristics is unavoidable. By contrast, a high-structure carbon black having a small mean primary particle diameter in a matter of 20 m$\mu$m has some antistatic effect and relatively favorable electromagnetic conversion characteristics, but has so far been considered incapable of making any contribution to a lowering of the coefficient of friction.

According to this invention, it has now been found that a carbon black having such a mean primary particle diameter d and a given particle size distribution $\sigma$ corresponding to this d gives a suitable degree of smoothness on the surface of a magnetic layer and so is effective for lowering the coefficient of friction, due to containing no carbon black particles having an extremely large particle diameter. Then, such action is further effectively exerted, while the magnetic medium runs at high speed. In addition, this carbon black is well dispersible in the binder, so that the electromagnetic conversion characteristics required for the magnetic recording medium can be imparted to the magnetic layer.

More specifically, when $d<25$ m$\mu$m, there is an increase in the coefficient of friction with some deterioration of running stability. This is true even when $\sigma = 12$-$24$ m$\mu$m. When $d>65$ m$\mu$m, on the other hand, there is some deterioration of electromagnetic conversion characteristics. This is again true even if $\sigma = 12$-$24$ m$\mu$m. By contrast, when $d=25$-$65$ m$\mu$m but $\sigma<12$ m$\mu$m, there is some deterioration of electromagnetic conversion characteristics with deteriorations of running stability and hence C/N ratios as a result. And when $\sigma>24$ m$\mu$m, there is some deterioration of electromagnetic conversion characteristics. These effects are critically improved at $d=25$-$85$ m$\mu$m and $\sigma=12$-$24$ m$\mu$m.

Measurement of the particle diameter of such carbon black, for instance, may be achieved with electron microscope photographs. More illustratively, transmission type electron microscope (TEM) photographs were taken of carbon black particles at magnifications of 10,000–100,000, from which some, say, about 1,000 carbon black particles were sampled at random for actual primary particle diameter measurements. By calculation, they were averaged to find the mean primary particle diameter. From the particle diameters thus determined, the standard deviation $\sigma$ of the particle diameter deviation $\sigma$ is found by statistical technique.

In the present invention, it is preferred that such carbon black have an oil absorption in DBP of 100 ml/100 g or lower, esp., 40–90 ml/100 and a specific surface area of 100 m$^2$/g, esp., 30–80 m$^2$/g, as measured by the BET adsorption method using nitrogen adsorption. When the oil adsorption in DBP and the BET specific surface area assume such values, the effect of this invention is further improved. It is generally understood that, in a magnetic layer, such carbon black has often a low structure in which one to a few primary particles exist. One or two or more such carbon blacks having such particle diameters and particle size distributions as mentioned above may be used to achieve similar particle diameters and size distributions.

In the present invention, no special other limitation is imposed on the carbon black used, if it has such d and $\sigma$ as mentioned above. To this end, use may be made of different types of carbon black obtained by different production processes such as thermal black, channel black, acetylene black, furnace black and lamp black.

In the present invention, it is preferred that the amount of such carbon black used be 15 parts by weight or lower, esp., 1–10 parts by weight per 100 parts by weight of ferromagnetic powders. By allowing the content of the carbon black to lie in this range, it is possible to obtain much more improved running stability and electromagnetic conversion characteristics than ever before.

The magnetic layer containing such carbon black is obtained by dispersing ferromagnetic powders in a binder, and is then coated on the nonmagnetic support substrate. The ferromagnetic fine powders used, for instance, may be known ferromagnetic fine powders, for instance, those of oxides such as $\gamma$-Fe$_2$O$_3$, Co-containing $\gamma$-Fe$_2$O$_3$, Fe$_3$O$_4$, Co-containing Fe$_3$O$_4$, CrO$_2$, barium ferrite and strontium ferrite, and those of Fe, Co and Ni or their alloys.

As the binder in which these ferromagnetic fine powders are dispersed, use may be made of those generally used for magnetic layers which may or may not be modified or otherwise denatured by radiation sensitization and which may be used alone or in combination of two or more. For instance, mentioned are vinyl chloride resin, vinyl chloride-vinyl acetate copolymers, vinyl chloride-vinyl acetate-vinyl alcohol copolymers, polyvinylidene chloride-acrylonitrile copolymers, phenoxy resin, cellulosic derivatives, acrylonitrile-butadiene rubber, styrene-butadiene rubber, epoxy resin, polyurethane resin, polyester resin, polyisocyanate and polyamide. Preferably, these binders have been thermally set by the addition of curing agents or by radiations.

If required, the magnetic layer of this invention may contain an abrasive. As the abrasive, use may be made of generally used ones such as alumina, chromium oxide and silicon carbide, but particular preference is given to an abrasive having a Mohs hardness of 6 or higher.

If required, the magnetic layer of this invention may additionally contain lubricants, dispersants, antistatics or other additives, for instance, paraffin, silicone oil, fatty acids and fatty acid esters. Note that the magnetic layer is generally about 0.5–5 $\mu$m in thickness.

The nonmagnetic support substrated used in this invention, for instance, may be plastics such as polyethylene terephthalate, polyethylene naphthalate and polypropylene, glass, ceramics and metals, which may have been surface-treated, if required.

The media of this invention may be in the form of tapes, disks and drums. It is noted, however, that their effect is further improved by sliding them with magnetic heads at a running speed of at least 0.5 m/sec. esp., at least 2.5 m/sec.

EXAMPLES

In the following description, the present invention will be explained more specifically with reference to some illustrative examples.

Example 1

The following carbon black containing composition was well dispersed together by means of a sand grinder mill, and the dispersant was stirred with 3 parts by weight of a binder curing agent polyisocyanate, followed by filtration. This product was then coated on both sides of a polyethylene terephthalate film at a thickness of 5 $\mu$m upon dried. The obtained magnetic layer was calendered to smooth its surface, and then punched out to form a magnetic disk of 2 inches in diameter. It is noted that the "parts" will hereinafter be given by weight.

| | |
|---|---|
| Iron type ferromagnetic alloy powders (with a BET surface area of 40 m$^2$/g) | 100 parts |
| Vinyl chloride-vinyl chloride copolymer | 7 parts |
| Polyurethane resin | 9 parts |
| Carbon black A | |
| Oil absorption 70 ml/100 g | |
| BET value 55 m$^2$/g | |
| Mean primary particle diameter 45 m$\mu$m | |
| $\sigma = 17$ m$\mu$m | 5 parts |
| $\sigma$-Alumina | 5 parts |

-continued

| | |
|---|---|
| Butyl stearate | 1 parts |
| Methyl ethyl ketone | 250 parts |

Comparative Example 1

A magnetic disk was obtained by following Example 1 with the exception that the following carbon black B having a mean primary particle diameter d<25 mμm was used in place of carbon black A.
Oil absorption 58 ml/100 g
BET value 137 m²/g
Mean primary particle diameter 24 mμm
$\sigma=7$ mμm Comparative Example 2

A magnetic disk was obtained by following Example 1 with the exception that carbon black C of $\sigma<12$ mμm was used for carbon black A.
Oil absorption 65 ml/100g
BET value 60 m²/g
Mean primary particle diameter 40 mμm
$\sigma=10$ mμm Comparative Example 3

A magnetic disk was obtained by following Example 1 with the exception that carbon black D of $\sigma<12$ mμm was used for carbon black A.
Oil absorption 76 ml/100g
BET value 93 m²/g
Mean primary particle diameter 28 mμm
$\sigma=10$ mμm Comparative Example 4

A magnetic disk was obtained by following Example 1 with the exception that carbon black E of d>65 mμm and $\sigma>12$ mμm was used for carbon black A.
Oil absorption 71 ml/100 g
BET value 25 m²/g
Mean primary particle diameter 85 mμm
$\sigma=32$ mμm Comparative Example 5

A magnetic disk was obtained by following Example 1 with the exception that carbon black F of d>>65 mμm and $\sigma>>24$ mμm was used for carbon black A.
Oil absorption 41 ml/100 g
BET value 6 m²/g
Mean primary particle diameter 390 mμm
$\sigma=172$ mμm Example 2

A magnetic disk was obtained by following Example 1 with the exception that a mixture of 4 parts by weight of carbon black C with 1 part by weight of carbon black E was used instead of 5 parts by weight of carbon black A.

Comparative Example 6

A magnetic disk was obtained by following Example 1 with the exception that a mixture of 2.5 parts by weight of carbon black C with 2.5 parts by weight of carbon black E was used instead of 5 parts by weight of carbon black A.

Set out in Table 1 are the physical properties of carbon blacks A-F used in Examples 1 and 2 as well as Comparative Example 1-6 and the running properties and electromagnetic conversion characteristics of the magnetic disks containing these carbon blacks.

TABLE 1

| Carbon black | Particle Size Distribution (mμm) Mean | $\sigma$ | Carbon black properties Oil absorption (ml/100 g) | BET (m²/g) | Magnetic disk characteristics Coefficient of friction | Torque (mA) | Electromagnetic conversion characteristics Output 7 MHz (dB) | C/N −0.3 MHz (dB) | −1.0 MHz (dB) | |
|---|---|---|---|---|---|---|---|---|---|---|
| A | 45 | 17 | 70 | 55 | 0.20 ○ | 81 ○ | −0.4 ○ | −0.1 ○ | +0.8 ○ | Example 1 |
| B | 24 | 7 | 58 | 137 | 0.27 X | 113 X | ±0 ○ | −0.4 ○ | +1.2 ○ | Comparative Example 1 |
| C | 40 | 10 | 65 | 60 | 0.27 X | 91 X | −0.4 ○ | −0.6 X | +1.0 ○ | Comparative Example 2 |
| D | 28 | 10 | 76 | 93 | 0.27 X | 89 X | −0.1 ○ | −1.8 X | +0.9 ○ | Comparative Example 3 |
| E | 85 | 32 | 71 | 25 | 0.18 ○ | 76 ○ | −0.9 X | −2.6 X | +0.2 X | Comparative Example 4 |
| F | 390 | 170 | 41 | 6 | 0.18 ○ | 78 ○ | −1.4 X | −1.8 X | −0.1 X | Comparative Example 5 |
| C/E-4/1 | 45 | 18 | | | 0.22 ○ | 82 ○ | −0.4 ○ | −0.4 ○ | +0.7 ○ | Example 2 |
| C/E = 2.5/2.5 | 53 | 26 | | | 0.20 ○ | 80 ○ | −0.7 X | −2.2 X | +0.6 ○ | Comparative Example 6 |

Here the coefficient of friction was found by rotating each disc at a linear speed of 0.7 m/sec, measuring the load on the associated head by means of a strain indicator and calculating the value of $\mu$ from this load. The load applied was 30 g.

The rotation torque was measured as a current loaded on the spindle motor of a magnetic disk drive.

Measurement of the outputs and C/N ratios was done at the outermost peripheries by recording single signals having a recording frequency of 7.0 MHz and then measuring spectra of 7.0 MHz and 6.7 MHz and 6.0 MHz of the reproduced signals with a spectral analyzer. For C/N, the ratios were found.

Whether or not there values are practically usable are estimated by ○ and X, which are again shown in Table 1. Note that FIG. 1 represents the particle size distributions of carbon blacks A-E used in Example 1 and Comparative Examples 1-4.

Similarly, FIG. 2 illustrates the particle size distributions of a plurality of carbon blacks used in Example 2 and Comparative Example 6.

From the results shown in FIG. 1, the critical effect of this invention will be clearly understood.

EFFECT

According to the present invention, there is provided a magnetic recording medium which has a reduced coefficient of friction and is improved in terms of running stability and electromagnetic conversion characteristics.

What is claimed is:

1. A magnetic recording medium consisting essentially of a nonmagnetic support substrate and one magnetic layer in which ferromagnetic powders and one kind of carbon black are dispersed in a binder, wherein:

said carbon black has a mean primary particle diameter lying in the range of 30–60 m$\mu$m with the standard deviation $\sigma$ of the particle size distribution being from 14 to 20 m$\mu$m, an oil absorption in dibutyl phthalate of a 40–90 ml/100 g, and a BET specific surface area of 30–80 m$^2$/g.

2. A magnetic recording medium as claimed in 1, wherein when said recording medium is used for recording with a magnetic head its sliding speed relative to the magnetic head is at least 0.5 m/sec.

* * * * *